(12) United States Patent
Caire

(10) Patent No.: US 8,472,963 B2
(45) Date of Patent: *Jun. 25, 2013

(54) VARIABLE COORDINATION PATTERN APPROACH FOR IMPROVING PERFORMANCE IN MULTI-CELL OR MULTI-ANTENNA ENVIRONMENTS

(75) Inventor: Giuseppe Caire, South Pasadena, CA (US)

(73) Assignee: NTT DoCoMo, Inc., Tokyo (JP)

( * ) Notice: Subject to any disclaimer, the term of this patent is extended or adjusted under 35 U.S.C. 154(b) by 705 days.

This patent is subject to a terminal disclaimer.

(21) Appl. No.: 12/538,729

(22) Filed: Aug. 10, 2009

(65) Prior Publication Data

US 2010/0040006 A1    Feb. 18, 2010

Related U.S. Application Data

(60) Provisional application No. 61/088,714, filed on Aug. 13, 2008.

(51) Int. Cl.
*H04W 40/00* (2009.01)

(52) U.S. Cl.
USPC ............................. 455/446; 455/101; 455/447

(58) Field of Classification Search
None
See application file for complete search history.

(56) References Cited

U.S. PATENT DOCUMENTS

| 7,574,179 | B2 * | 8/2009 | Barak et al. | 455/101 |
| 8,229,443 | B2 * | 7/2012 | Caire et al. | 455/446 |
| 2008/0274745 | A1 * | 11/2008 | Barak et al. | 455/447 |
| 2009/0291699 | A1 * | 11/2009 | Heath et al. | 455/501 |
| 2010/0041407 | A1 * | 2/2010 | Caire et al. | 455/446 |
| 2010/0041408 | A1 * | 2/2010 | Caire et al. | 455/446 |

OTHER PUBLICATIONS

Karakayali, M., et al., "On the Maximum Common Rate Achievable in a Coordinated Network", Mar. 3, 2006, 6 pages.
Caire, G., et al., "Multiuser MIMO Downlink with Limited Inter-Cell Cooperation: Approximate Interference Alignment in Time, Frequency, and Space", 8 pages.
Boccardi, F., et al., "Limited Downlink Network Coordination in Cellular Networks", The 18th Annual IEEE International Symposium on Personal, Indoor, and Mobile Radio Communications (PIMRC '07), 5 pages, 2007.
Caire, G., et al., "Multiuser MIMO Achievable Rates with Downlink Training and Channel State Feedback", 31 pages.
Caire, G., et al., "On the Achievable Throughput of a Multiantenna Gaussian Broadcast Channel", IEEE Transactions on Information Theory, vol. 49, No. 7, Jul. 2003, pp. 1691-1706.

(Continued)

*Primary Examiner* — Erika A Washington
(74) *Attorney, Agent, or Firm* — Blakely, Sokoloff, Taylor & Zafman LLP

(57) ABSTRACT

A method and apparatus is disclosed herein for verifying coordination patterns to improve performance in a multi-cell or multi-antenna environment. In one embodiment, the method comprises storing a set of predefined and different coordination patterns, where each coordination pattern specifies entities in the plurality of cells that are to coordinated together in their transmissions in each cluster of cells on different transmission resources defined for example in one or both time and frequency; and varying entities that coordinate with each other in their transmissions in each cluster of cells over transmission resources according to the predefined coordination patterns.

23 Claims, 14 Drawing Sheets

OTHER PUBLICATIONS

Marzetta, T., "How Much Training Is Required for Multiuser MIMO?", 5 pages.

Taoka, H., et al., "Field Experiments in Ultimate Frequency Efficiency Exceeding 30 bit/Second/Hz Using MLD Signal Detection in MIMO-OFDM Broadband Packet Radio Access", 6 pages.

Huawei, "DL Coordinated Beam Switching for Interference management in LTE-Advanced", Aug. 12, 2008, 6 pgs.

Karakayali, M. Kemal, et al., "Network Coordination for Specialty Efficient Communications in Cellular Systems", IEEE Wireless Communications, Aug. 1, 2006, pp. 56-61, vol. 13, No. 4, Piscataway, NJ, USA.

Das, Suman, et al., "Dynamic Load Balancing Through Coordinated Scheduling in Packet Data Systems", IEEE INFOCOM 2003, 11 pgs.

Etri, "Coordinated multi-cell transmission for LTE-Advanced downlink", Aug. 12, 2008, 4 pgs.

PCT International Search Report for PCT Patent Application No. PCT/US2009/053463, Nov. 20, 2009, 6 pgs.

PCT Written Opinion of the International Searching Authority for PCT Patent Application No. PCT/US2009/053463, Nov. 20, 2009, 7 pgs.

PCT International Preliminary Report on Patentability for PCT Patent Application No. PCT/US2009/053463, Feb. 24, 2011, 7 pgs.

\* cited by examiner

VARIABLE COORDINATION PATTERN APPROACH FOR IMPROVING PERFORMANCE IN MULTI-CELL OR MULTI-ANTENNA ENVIRONMENTS

PRIORITY

The present patent application claims priority to and incorporates by reference the corresponding provisional patent application Ser. No. 61/088,714, titled, "A Variable Coordination Pattern Approach to Improving Performance in a Multi-Cell or Multi-Antenna Environments," filed on Aug. 13, 2008.

RELATED APPLICATIONS

The present application is related to the following applications: U.S. patent application Ser. No. 12/538,733, filed Aug. 10, 2009, now U.S. Pat. No. 8,229,443, issued Jul. 24, 2012, titled "A Method OF Combined User and Coordination Pattern Scheduling Over Varying Antenna and Base Station Coordination Patterns in a Multi-Cell Environment" and U.S. patent application Ser. No. 12/538,739, filed Aug. 10, 2009, titled "A Method for Varying Transmit Power Patterns in a Multi-Cell Environment", both concurrently filed herewith.

FIELD OF THE INVENTION

The present invention relates to the field of wireless transmission in a multi-cell wireless environment; more particularly, the present invention relates to the inter-connectivity architecture and the coordination patterns that exist between transmit antennas located at two or more remotely placed sites.

BACKGROUND OF THE INVENTION

For purposes herein, the term "cell" is used to describe a bounded geographic area in which a number of users are serviced by a set of transmit antennas often co-located and operating at a base-station. The antennas are used to jointly transmit signals to users, and the signals are produced by a single common physical layer mechanism. Given pathloss, the signal power received by a user from these antennas drops with increasing distance of a user from these antennas. Therefore, users receiving a suitable minimal signal level are often located in a bounded geographic area around such antennas. Neighboring cells (base-stations and antennas in neighboring cells) operate independently from each other in the respect that useful signals to a given user are only sent by antennas (the base-station) within a user's cell.

A classic example of such "cells" is shown in FIG. 1A. Referring to FIG. 1A, users are mapped to the base-station site that is "geographically closest", resulting in the classic hexagonal pattern. For example, Cell 1 consists of a central set of 4 antennas at a single base-station, "BS1", supporting a group of users including but not limited to "user1", "user2", "user3", and "user4". This "geographically closest" station rule makes sense in a model in which the received signal energy a user gets from any base-station (or antenna) decreases monotonically with distance from that station, and by the same mathematical function for every station. In general, with shadowing and other effects, the cell boundaries will not conform to such a regular structure, but such a situation has the same underlying properties of the regular structure. In the communication system of FIG. 1A, the transmitted signals themselves originating at each base-station can be transmitted using any technique from a variety of well-known techniques, such as, for example, single-input single-output (SISO) transmission; multiple input single output (MISO) transmission; multiple input multiple output (MIMO) transmission; and, multi-user MIMO (MU-MIMO) transmission whereby multiple antennas coordinate a joint concurrent transmission to multiple users. Underlying transmissions can be based on Orthogonal Frequency Division Multiplexing (OFDM), Code Division Multiple Access (CDMA), etc.

As mentioned, in such a scenario, it is well known that if neighboring base-stations use the same transmission resource, e.g. the same frequency band at the same time, that the users in a cell will experience interference from other cells. Such interference can be quite extreme near the edges of cells, thus limiting performance in such areas. This is a classic problem with any cellular structure, and is true for SISO, MIMO and MU-MIMO transmissions. Transmission resources may also include, in addition to slots in time, frequency and jointly in time and frequency, codes in CDMA, polarization of antennas, etc.

Classic cellular systems can control interference by using different frequencies in neighboring cells. For the hexagonal structure in FIG. 1A, one can use 3 different frequencies (with a frequency reuse factor of three) so that no two neighboring cells use the same frequency. This is illustrated in FIG. 1B. This allows for increased separation of cells (distance separation) that use the same frequency, and helps greatly in reducing the interference between cells (such interference is termed "inter-cell interference"). However, the efficiency of the system can be hurt because the frequency reuse approach by nature reduces the effective number of frequencies (the bandwidth) used for signaling information to users in each of the cells. In fact, with a frequency reuse factor of "F", the useful signal energy to users can be reduced by a factor of "F", potentially lowering throughputs to each user by up to the same factor despite the benefits of inter-cell interference reduction. Furthermore there are additional losses by not exploiting diversity among frequencies, and this can reduce the effective rates a user may receive even more. Note that his frequency reuse concept can be considered as some minimal, but fixed coordination between stations.

Coordinating transmissions across multiple cells can help to alleviate such inter-cell interference (ICI) effects, which are particularly harmful to users at the edge of cells (such users termed "edge users"). In the extreme case, jointly coordinating transmissions over every cell, using MU-MIMO as the underlying signaling, can have significant benefit in alleviating problems due to ICI. Indeed, under full coordination, where all base-stations coordinate with each other and transmissions from any and every station can serve any or every user, there is no concept of a cell. Here the MIMO downlink reduces to a single MIMO broadcast channel. This is also in essence a large Distributed Antenna System (DAS) in which all antennas at all locations are controlled by a central single entity, and in principle some resource from all antennas transmits to all users in its signaling range. Such a system, however, may not be practical in large realistic deployments with large numbers of base-stations, realistic pathloss effects, and large numbers of users. The complexity of coordinating all antennas, problems of asynchrony in reception of signals from highly geographically separated antennas to any given user, and the amount and latency of information that needs to be shared between remote base-stations (antennas) over the backbone infra-structure, can render such an ideal case impractical. Thus, full coordination strictly at the physical layer is hard to achieve over a large multi-cell system.

However, an encouraging result is that by using even limited (yet practical) levels of coordination, significant performance benefits can still be obtained over a conventional cellular architecture. In such a system, non-overlapping clusters of stations coordinate their transmissions. An example of this is shown in FIG. 2 where groups (clusters) of 3 adjacent cells are coordinated. For example, Cells 1, 2 and 3 coordinate transmissions, Cells 4, 5 and 6 coordinate transmissions, and so on. Each of these groups of three cells are now acting as a single "cell", or what is termed herein as a "cluster". Again, the concept of a "cell" is different from that in a classic "cellular" structure. However, because coordination is partial, even this system will inherently always have boundaries where users that see less favorable conditions. Specifically, such architectures do have cooperation boundaries at which ICI is significant and may severely limit the performance of "edge users", where such users are now "cluster-edge" users. An example of such a user is "user(6)" in FIG. 2.

More specifically, in multi-cell, or even single-cell, systems, with a fixed cell structure or a fixed cluster structure, the rate and quality of service (QoS) a user receives depends strongly on its physical relationship with respect to the transmit antennas used to send it useful signals (send it information bearing signals). It also depends, importantly, on the user's relationship to antennas that are sending interfering signals, i.e. signals intended for other users. The net tradeoff a user experiences depends on both the useful signal term and the interference terms a user receives. The fixed structure fixes this tradeoff for a given user.

For example, one measure often used is in terms of the Signal to Interference and Noise Ratio (SINR) a user experiences. The SINR (or performance) tradeoffs can, for example, depend on a user's geographic location. Such tradeoffs can also on other effects such as shadowing, terrain, antenna heights, etc. Nonetheless, the nominal (average) SINR a user experiences at a given location in a fixed cluster or fixed cell structure is often given by (and fixed by) the structure.

If such clusters of antennas, both interfering and signaling, are fully coordinated in time, frequency and space, the signal powers can be improved, and the effect of interferences can be controlled and mitigated. For example, frequency reuse can be used in cluster structures as illustrated for cell structures in FIG. 1B. However, in all systems with a limited yet single coordination structure, there are limits to such improvements. This often means that users near the physical edge of a "coordination boundary" often will see impairments in performance, in particular due to interference from neighboring "cells" or clusters.

In addition, in a system with a limited yet single coordination structure, a user has no choice but to use the channels and antennas assigned to it. If a user is disadvantaged through geographic location or otherwise, nothing can be done to improve its situation beyond a certain limit.

Thus, all fixed-coordination pattern system inherently suffers from the problem of coordination boundaries.

SUMMARY OF THE INVENTION

A method and apparatus is disclosed herein for varying the coordination patterns to improve performance in a multi-cell, cluster-based, or multi-antenna environment. In one embodiment, the method comprises storing a set of predefined and different coordination patterns, where each coordination pattern specifies entities in the plurality of cells that are to coordinate together in their transmissions in each cluster of cells on different transmission resources; and varying entities that coordinate with each other in their transmissions in each cluster of cells over transmission resources according to the predefined coordination patterns. Such transmission resources can be defined in one or both time and frequency, and/or spreading codes. Thus, different coordination patterns may exist on different time and/or frequency slots.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
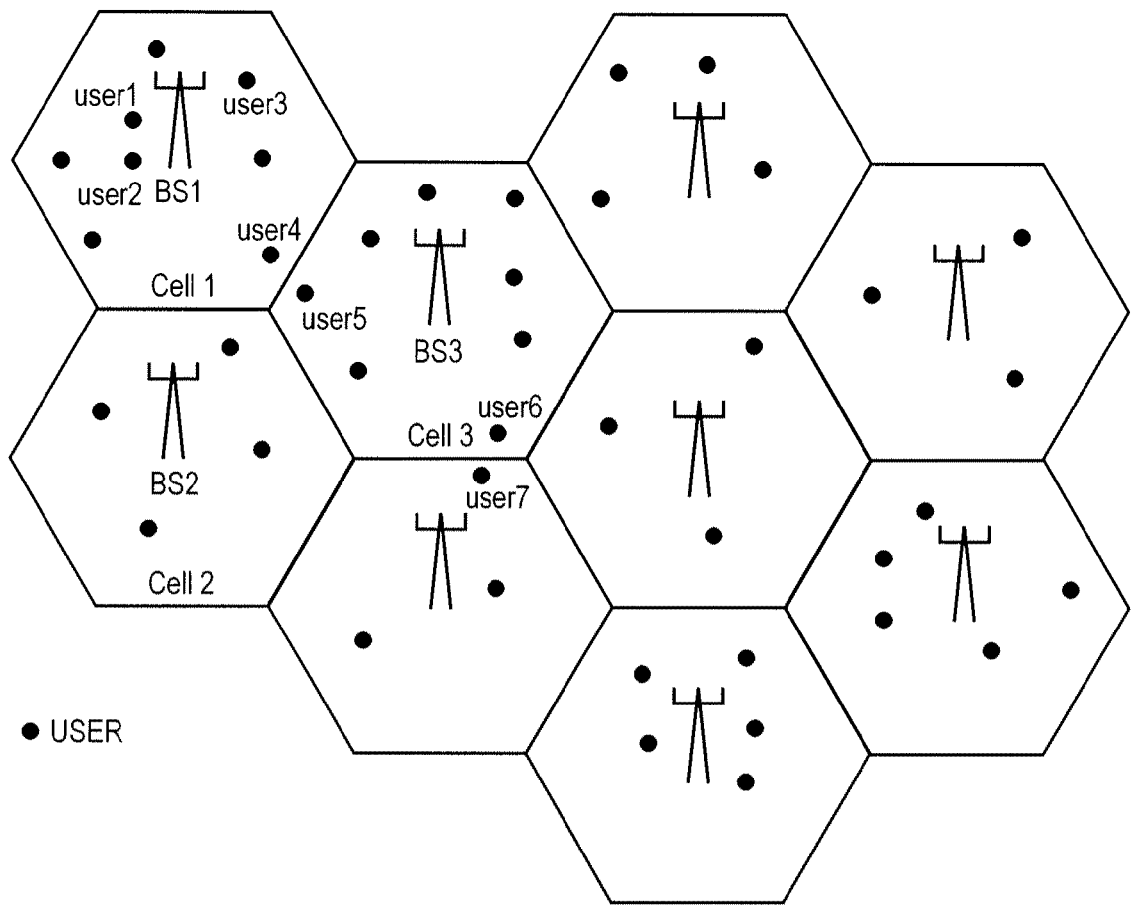
FIG. 1A illustrates users within classic hexagonal cells, wherein users are mapped to and served exclusively by the base-station in center of the cell.

A method and system for operating a multi-cell (or distributed antenna system) in which the coordination of antennas, or equivalently a "cell" structure, or equivalently the coordination pattern of cells, or equivalently the cluster structure, of the wireless system is made to vary in a controlled fashion over transmission resources. Such resources include but are not limited to time and/or frequency. In such cases, the variation happens in controlled fashion over a combination of time and frequency. In such a system of interest, different subsets of antennas are used to transmit to different subsets of users. Antennas within each antenna-subset are jointly controlled by an entity, e.g. a base-station, central controller, etc, which calculates and directs what signals to place on the antennas in order to serve users. Under control of the system, which may happen in a pre-programmed known pattern or in an adaptive fashion, such subsets of antennas are changed over transmission resources such as over time and/or over frequency. That is, the system operates in such a way that the coordinated antenna-subsets (and implicitly user-subsets) are purposefully varied. This has advantages over prior systems by allowing users to see different interference levels over time and/or frequency, some levels being more favorable than others. It therefore solves the inherent performance limitations a fixed coordination pattern system, e.g. as experienced by an "edge user" in cellular systems, or a "cluster-edge" user in a fixed cluster system, since the coordination boundaries vary. For example, some edge users will be closer to the center of a cluster when using one coordination pattern (i.e., away from the cluster edge) for some time and/or frequency or other transmission resource.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Embodiments of the invention include operating a multicell (or distributed antenna) wireless communication system in which the coordination of antennas, or equivalently the "cell" structure, or equivalently the coordination pattern of cells, or equivalently the cluster structure, of the wireless system to vary in a controlled fashion over transmission resources. Such transmission resources may be divided in time, or in frequency, or in any combination of the two. For example, systems often have time-frequency "slots" which correspond to a block in time and frequency. In one embodiment, varying the wireless system is performed by varying the antenna coordination pattern over such resources, e.g., over time and/or over frequency. In other words, the antennas are clustered in arrangements and the cluster arrangements are changed so that different sets of antennas are clustered, e.g., jointly controlled by a central entity, on different resources (e.g., slots).

A coordination pattern describes which antennas are coordinated together in their transmissions. A coordination pattern can be defined by a division of the antennas (on a given frequency at a given time) into subsets. Implicitly, different subsets are then used to serve different user-subsets over different time or frequency resources. Such subsets can also be disjoint (although that is not necessary, since a user can use multiple frequencies over multiple times).

Cluster arrangements can be used in a regular pre-determined fashion, such that the patterns alternate (e.g. vary periodically in time/frequency) between a number of possible cluster arrangements. Specifically, the cluster patterns are changed over time (and/or frequency) using a set of predetermined "base" coordination patterns. An example of a set of such patterns is given in FIG. 5 using base-stations and in FIG. 8 using Distributed Antenna Systems. For example, if patterns are varied in time, the coordination patterns can be changed through a periodic sequence of coordination patterns where the base-patterns are transitioned through in a predetermined order. Such changes can happen after each transmission opportunity (slot) or after a fixed number of slots. If patterns are varied over frequency, the assignment of the base-patterns over frequency can in fact be static in time. That is, one base-pattern exists forever over a given frequency band or group of frequencies, where the band/groups of different base-patterns do not overlap in frequency. There can be combinations of time and frequency variation that are between such two extremes. A single example may illustrate this aspect. Suppose a service of 12 base stations with base station identifiers (BSID) 1-12, and that have a coordination cluster size equal to 3. The clusters are shown below in brackets around the BSIDs for different times.

Time T=1 [1, 2, 3] [4, 5, 6] [7, 8, 9] [10, 11, 12]
T=2 1] [2, 3, 4] [5, 6, 7] [8, 9, 10] [11, 12
T=3 1, 2] [3, 4, 5] [6, 7, 8] [9, 10, 11] [12
T=4 [1, 2, 3] [4, 5, 6] [7, 8, 9] [10, 11, 12]
T=5 1] [2, 3, 4] [5, 6, 7] [8, 9, 10] [11, 12
T=6 1, 2] [3, 4, 5] [6, 7, 8] [9, 10, 11] [12

As shown above, the base stations that are in a particular cluster are changed at different times. For example, at time T=2, base station 1 is changed from being in a cluster with base stations 2 and 3 to being a cluster with base stations 11 and 12. Thus, at time T=3, base station 1 changes to being in a cluster with base stations 2 and 12. Then, at time T=4, base station 1 returns to being in a cluster with base stations 2 and 3.

Note that the same could be done by changing based on frequency. For example, let there be 3 frequency bands "F1", "F2" and "F3". One can assign the patterns to these bands as follows:

F1: [1, 2, 3] [4, 5, 6] [7, 8, 9] [10, 11, 12]
F2: 1] [2, 3, 4] [5, 6, 7] [8, 9, 10] [11, 12
F3: 1, 2] [3, 4, 5] [6, 7, 8] [9, 10, 11] [12

Here this assignment can exist in a static fashion for all time slots. This makes sense if the different frequency bands have equivalent statistics/properties, and there is no advantage of one band over another. If there is an advantage, then a joint variation in time and frequency could be used. As an example of this joint variation is as follows:

T=1, F1: [1, 2, 3] [4, 5, 6] [7, 8, 9] [10, 11, 12]
T=1, F2: 1] [2, 3, 4] [5, 6, 7] [8, 9, 10] [11, 12
T=1, F3: 1, 2] [3, 4, 5] [6, 7, 8] [9, 10, 11] [12
T=2, F2: [1, 2, 3] [4, 5, 6] [7, 8, 9] [10, 11, 12]
T=2, F3: 1] [2, 3, 4] [5, 6, 7] [8, 9, 10] [11, 12
T=2, F1: 1, 2] [3, 4, 5] [6, 7, 8] [9, 10, 11] [12
T=3, F3: [1, 2, 3] [4, 5, 6] [7, 8, 9] [10, 11, 12]
T=3, F1: 1] [2, 3, 4] [5, 6, 7] [8, 9, 10] [11, 12
T=3, F2: 1, 2] [3, 4, 5] [6, 7, 8] [9, 10, 11] [12

Figure 3:
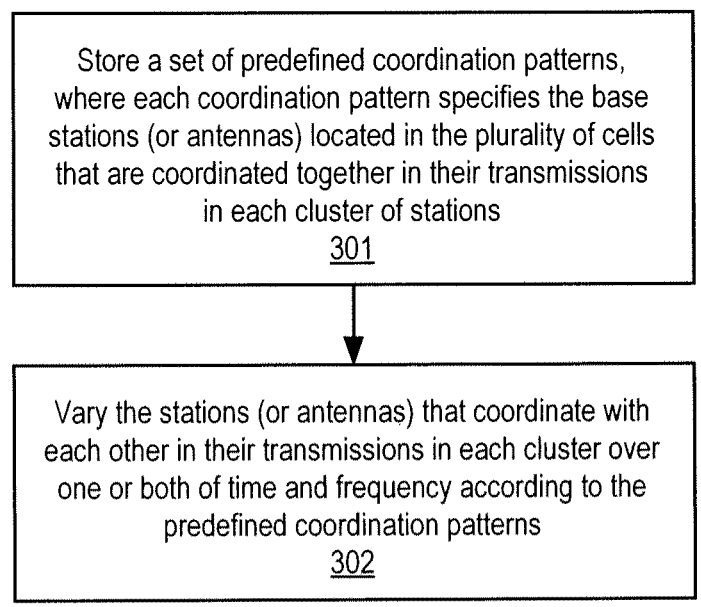
FIG. 3 is one embodiment of a process for use in a wireless communication system having a plurality of cells with a base station in each of the plurality of cell

FIG. 3 is one embodiment of a process for use in a wireless communication system having a plurality of cells with a base station in each of the plurality of cell. The process is performed by processing logic that may comprise hardware (circuitry, dedicated logic, etc.), software (such as is run on a general purpose computer system or a dedicated machine), or a combination of both. In one embodiment, the processing logic is part of a base station or central controller.

Figure 9:
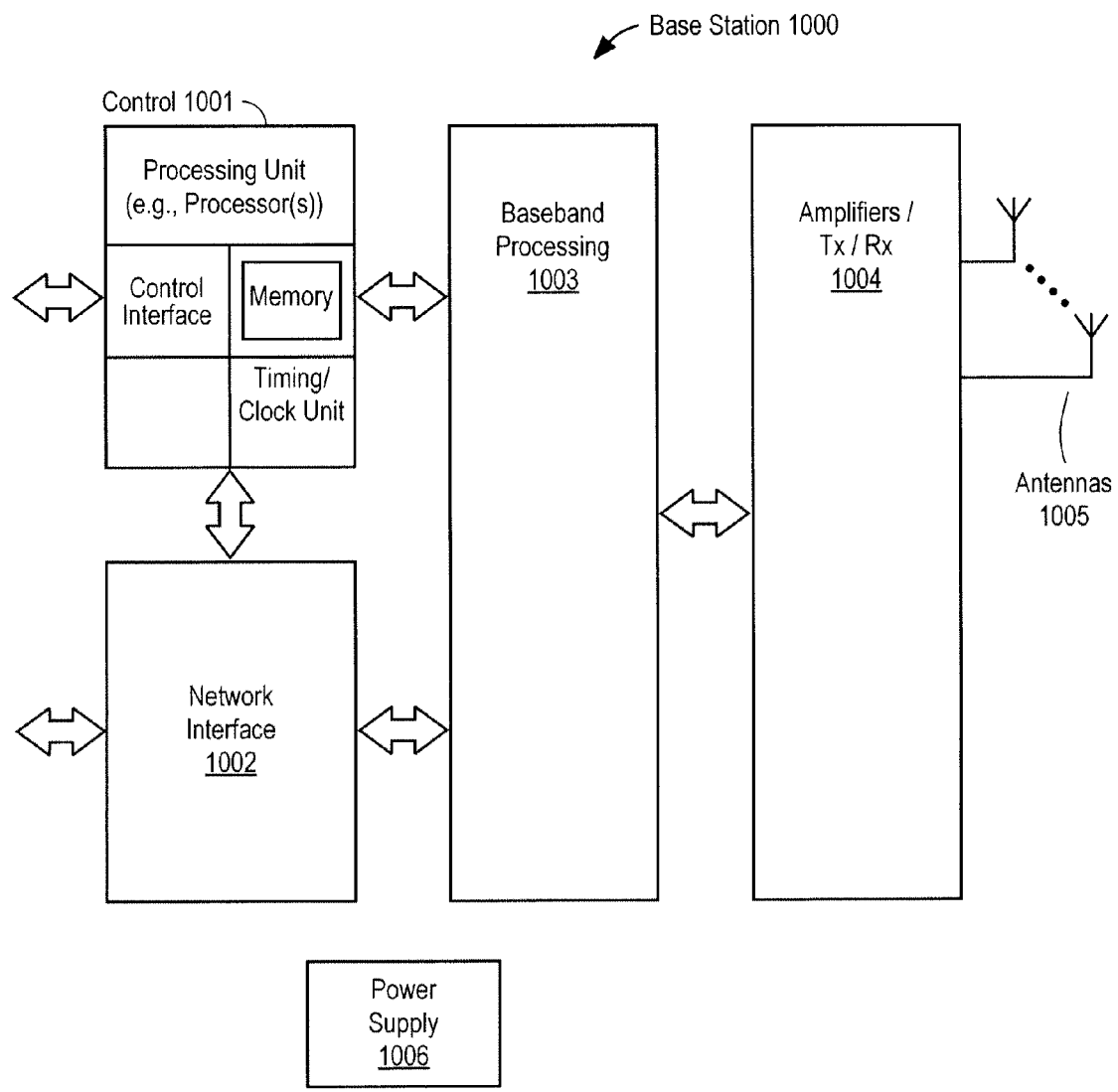
FIG. 9 is a block diagram of one embodiment of a base station.

Referring to FIG. 3, the process begins by processing logic storing a set of predefined coordination patterns, where each coordination pattern specifies the base-stations (or antennas as in FIG. 11) located in the plurality of cells that are coordinated together in their transmissions in each cluster of stations (which now serve a group/cluster of cells) (processing block 301). In one embodiment, storing a set of predefined coordination patterns comprises storing the set of predefined coordination patterns in each base station. In another embodiment, storing a set of predefined coordination patterns selected ahead of time comprises storing the set of predefined coordination patterns in each antenna controller. In another embodiment, storing a set of predefined coordination patterns selected ahead of time comprises storing the set of predefined coordination patterns in each antenna controller which are in fact central controllers remote geographically from the antenna or base-station site. FIG. 9 illustrates a base-station which may act as a controller. Here a base-station is connected to all possible antennas it can use (over all coordination patterns). For a specific pattern that exists in time (or frequency) the processing unit 1001a and base-band processing 1003 creates active signals in time (or frequency) only on antennas used in this pattern. For antennas not used in a pattern, the signals in time (or frequency) coming from the units are zero.

In one embodiment, each coordination patterns specifies which antennas within which cells are to coordinate together in their transmissions for each cluster. In one embodiment, clusters as specified in the coordination pattern are identical in size. In another embodiment, at least two clusters specified in the coordination patterns are different in size.

Using the stored predefined coordination patterns, processing logic varies the stations (or antennas) that coordinate with each other in their transmissions in each cluster over transmission resources, e.g. one or both of time and frequency, according to the predefined coordination patterns (processing block 302). In one embodiment, varying antennas that coordinate with each other comprises varying the antenna coordination pattern such that different subsets of antenna are selected to transmit to different subsets of users in a fashion that such antennas are jointly controlled. If subsets of users are determined geographically, then effectively the location of the transmit antennas determine the geographical area covered by the antennas. Thus, the geographical area served varies with the coordination pattern.

In one embodiment, varying antennas is performed to have users of the communication system experience different interference levels over different transmission resources, e.g. over different periods of time and/or frequency. For example, a user served by a cluster on one transmission resource, where the cluster is one of the predefined coordination patterns, may be closer to the edge of this cluster, yet the same user served by another cluster on another transmission resource may be now near the center of this cluster. Often, by being nearer to the cluster center, a user will experience a more favorable interference level. Sharing such favorable levels over all users necessitates the variation of patterns such that a given user sees favorable levels on some patterns (i.e. is near the center) and unfavorable levels on other patterns (i.e. is near the edge allowing other users to be at the center).

In one embodiment, one or more base stations in the system act as cluster controllers knowing when and with which base stations to coordinate transmissions. In one embodiment, at least one base station for each cluster acts as a cluster controller to direct other base stations with respect to coordinating transmissions by varying which cells are in each cluster. It may direct such transmissions by doing the necessary processing for all other base-stations using its own processing unit 1001a, and then sending the required processing output via inter-base-station links which are then applied locally to each of the respective base-stations baseband processing 1003.

Figure 11A:
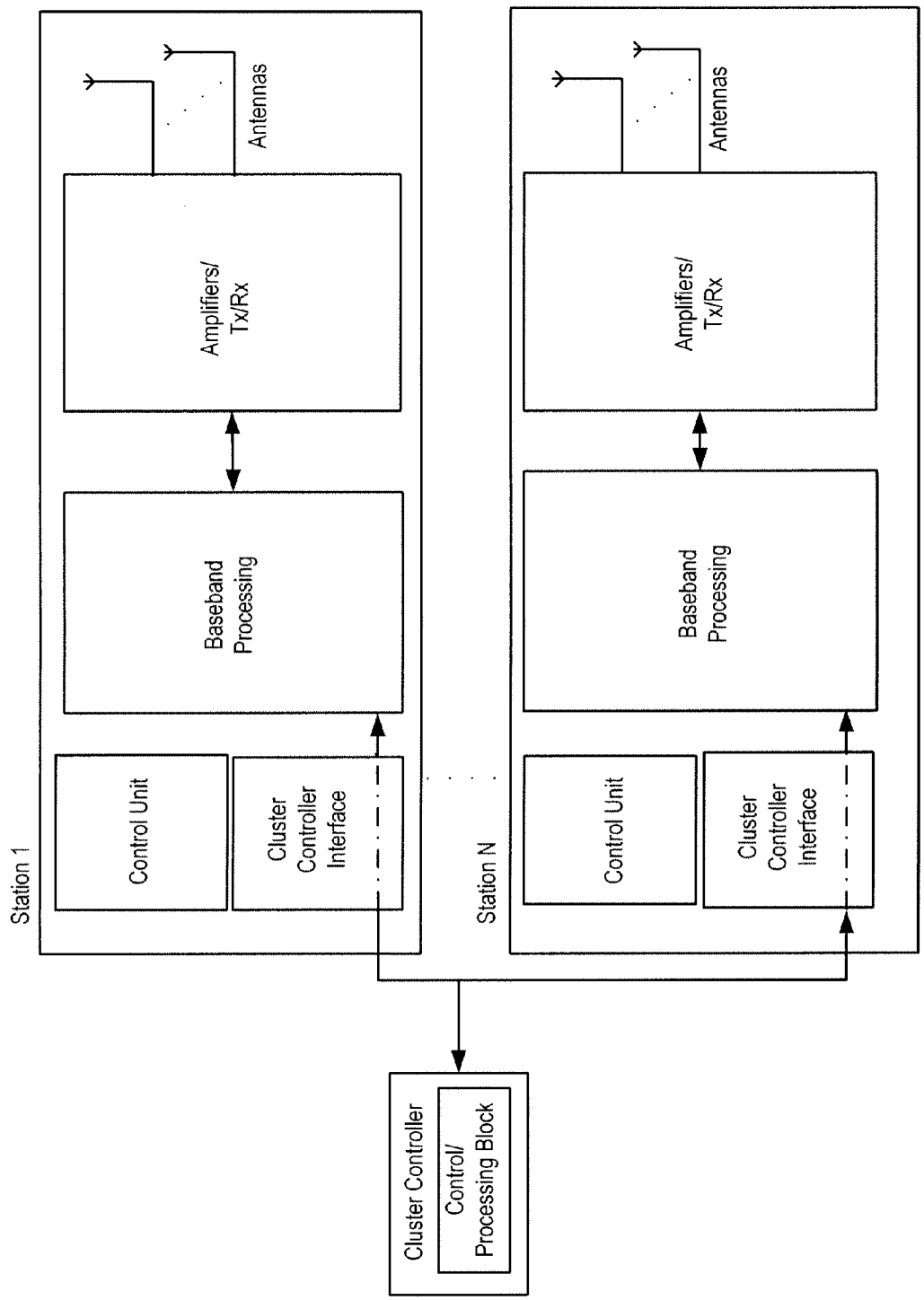
FIGS. 11A-C illustrate cluster controller arrangements.
Figure 11B:
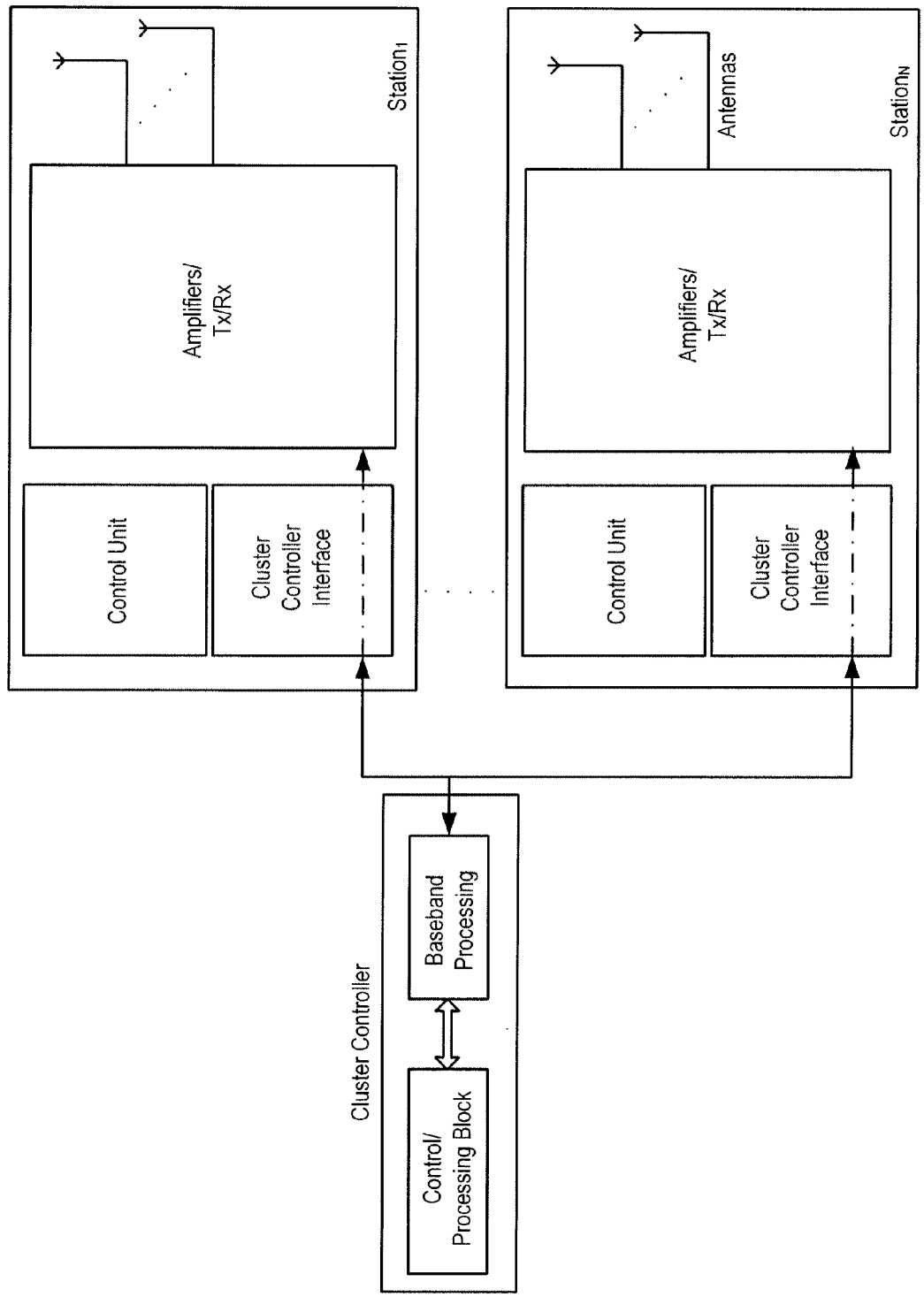
Figure 11C:
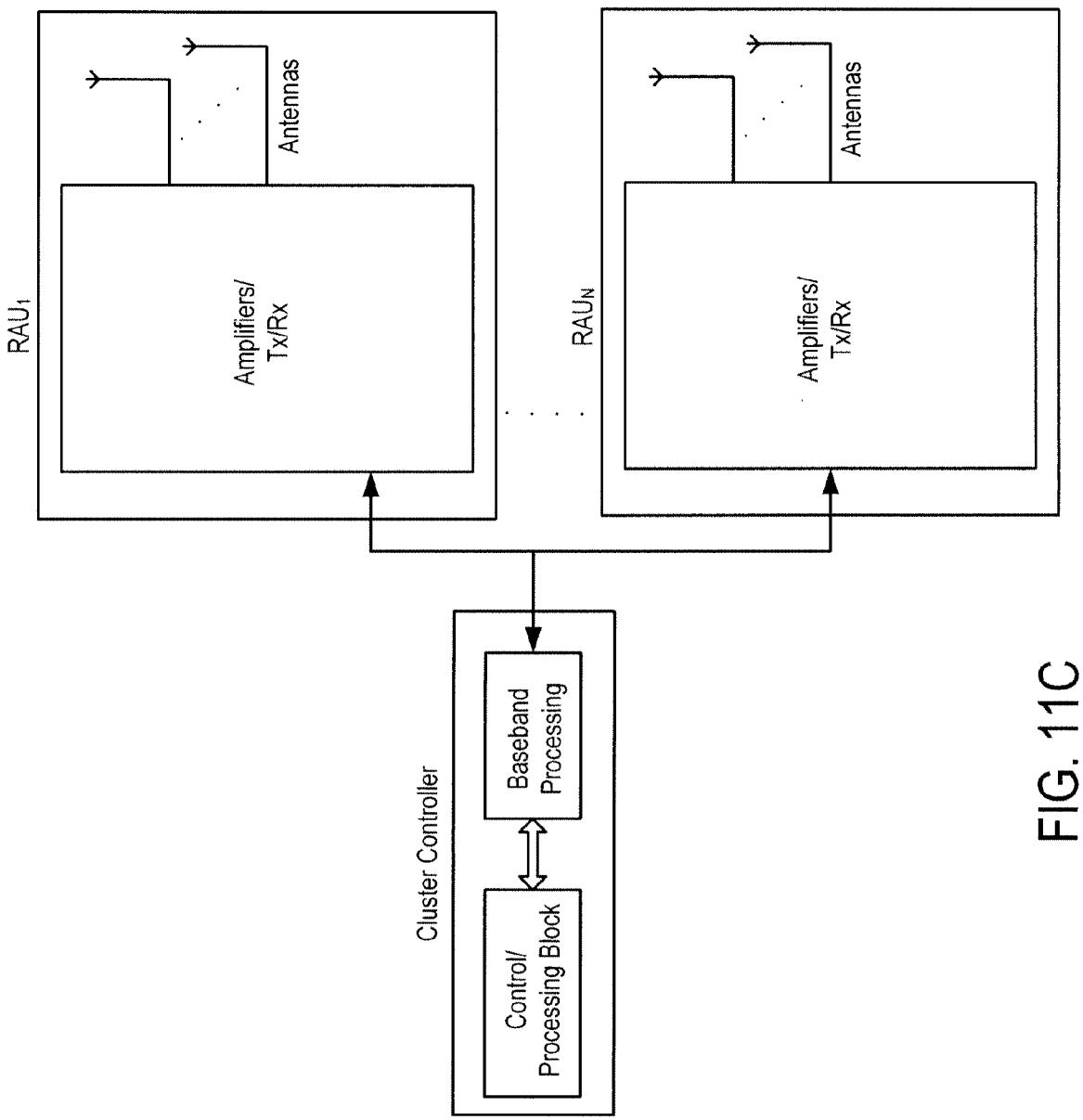

In one embodiment, cluster controllers are separate entities, apart from stations, knowing when and with which base stations to coordinate transmissions. Again, such controllers may do the required processing for all stations, as stations would do in their own processing units 1001a if acting independently, and then send the output of this block to local baseband processing logic functions residing in each base-station. This is shown in FIG. 11A. In another embodiment the cluster controller may itself perform the baseband processing locally, within its own hardware, sending such output to base-stations and using the amplifier 1004 in each station to send the transmissions. This is shown in FIG. 11B. In another embodiment, as in a Distributed Antenna System (DAS), the remote antennas may in fact consist only of the amplifier 1004 and the antenna 1005. These Remote Antenna Units (RAUs) are described later. In such a system, the entire control 1001 function, including the processing unit 1001*a*, baseband processing logic 1004, network interface 1002, reside in the controller of the cluster controller of the DAS system. This is shown in FIG. 11C.

Figure 2:
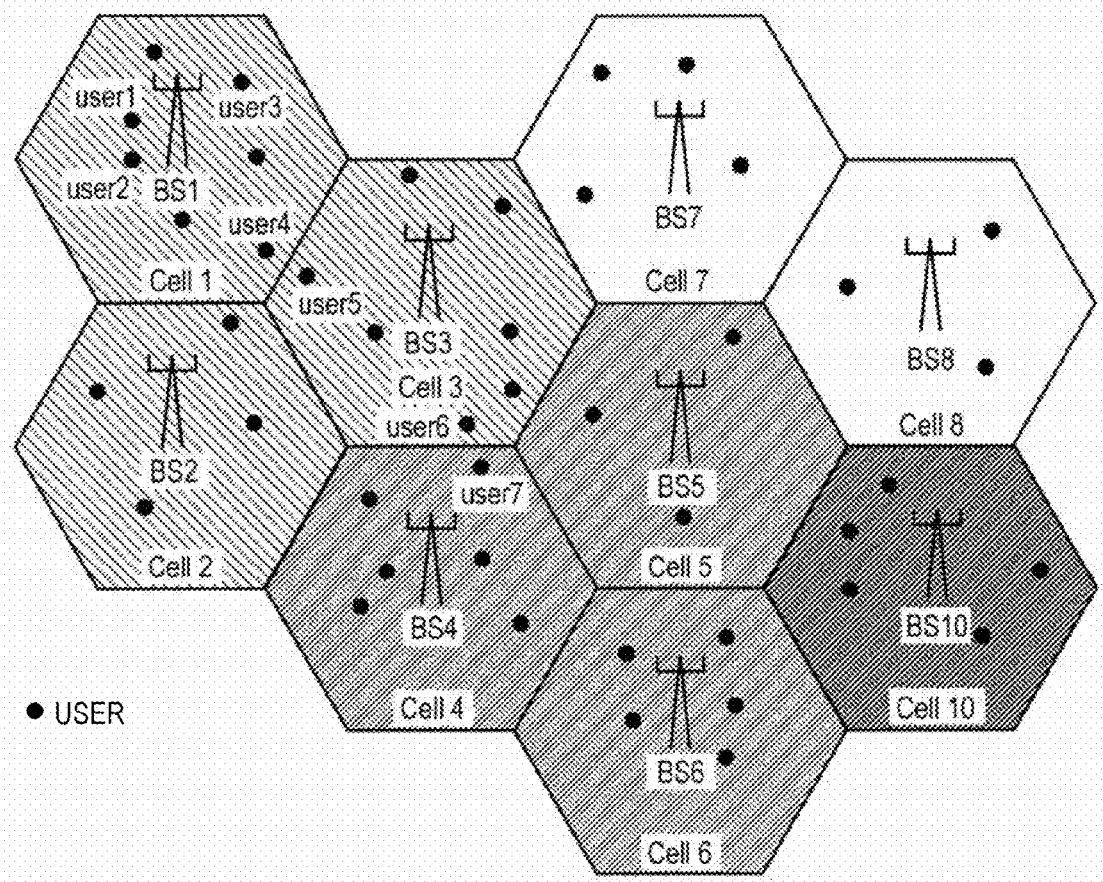
FIG. 2 illustrates a multi-cell case with coordination among clusters of three cells.
Figure 4:
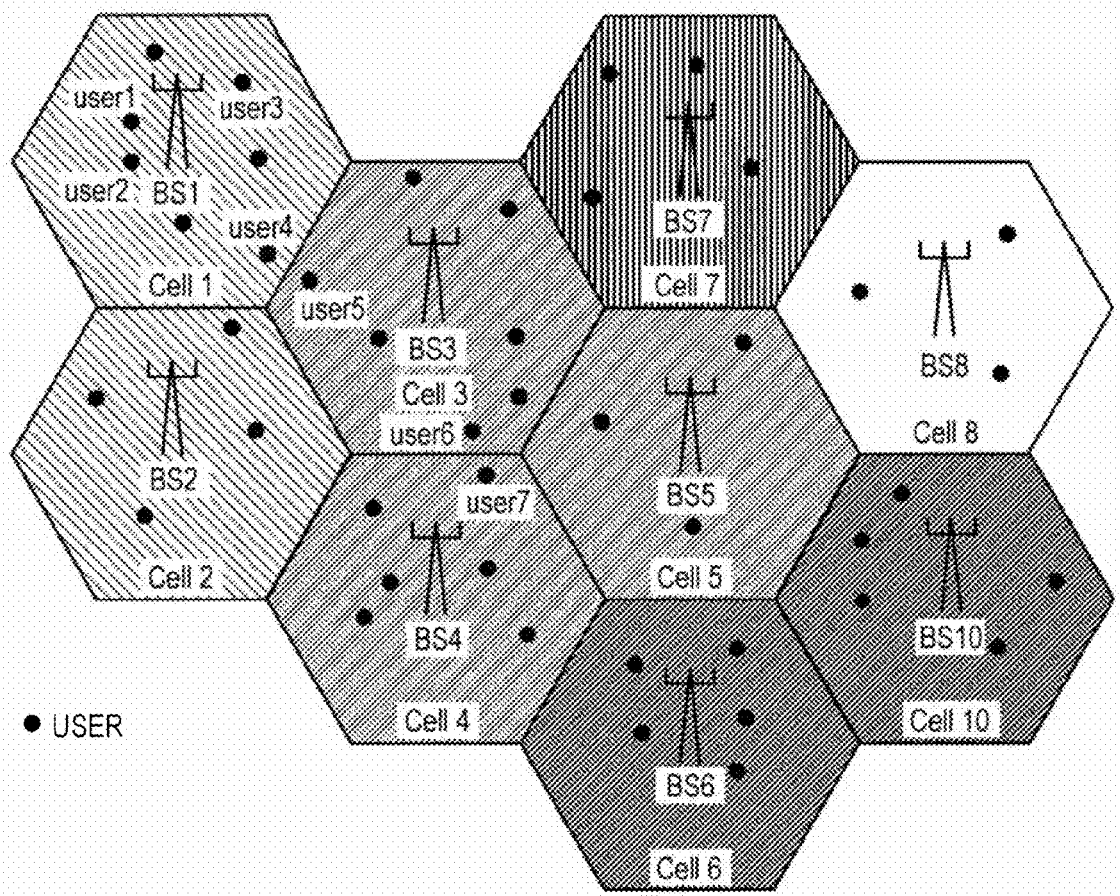
FIG. 4 illustrates multi-cell case with coordination among groups of cells, where the coordination pattern is different from that of FIG. 2.

The system can have two or more coordination patterns as reflected by two such patterns in FIG. 2 and FIG. 4. Such patterns can represent different instances in time, or frequency, or a combination thereof. Three possible coordination patterns, based on three cell clusters, are illustrated together in FIG. 5.

Embodiments of the invention include some of the structures, both cell-based and distributed antenna-based, to implement a changing coordination pattern.

Figure 1B:
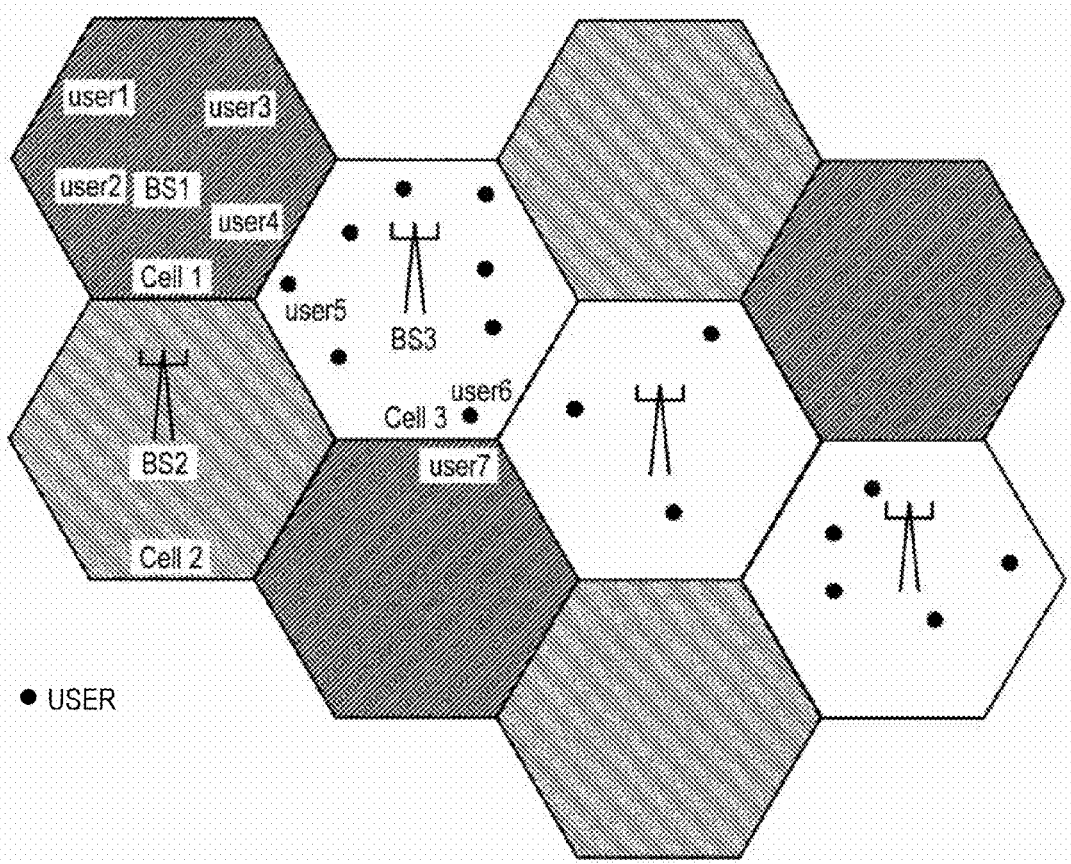
FIG. 1B illustrates classic frequency reuse pattern in a hexagonal cellular structure with frequency reuse factor three.
Figure 8:
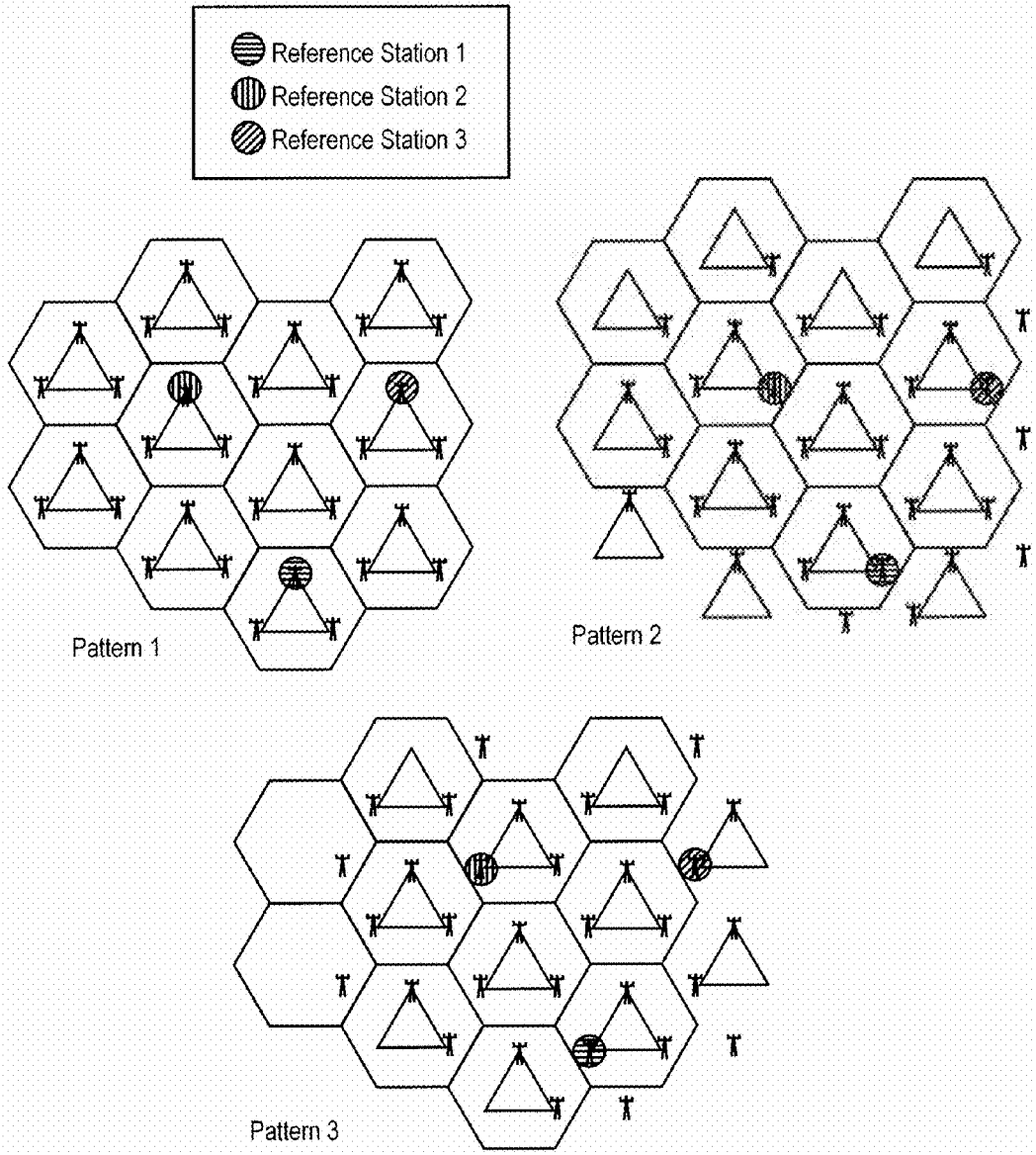
FIG. 8 illustrates an example showing a Distributed Antenna System (DAS) setup with coordination between 3 neighboring antenna sites, where the DAS inter-connectivity (coordination) pattern is different in Pattern 1, Pattern 2 and Pattern 3.

Note, as illustrated later in FIG. 8, embodiments of the invention are concerned with the variation of which antennas coordinate with each other. Antennas in FIG. 1 and FIG. 2 just happen to be located at base-stations. Antennas can also be located at any number of remote sites, as in a Distributed Antenna System in FIG. 8. In fact, in FIG. 8 one can see more clearly an equivalent view of the system as one in which the cell structure itself varies.

Both coordination clusters, and varying cell structures, are valid ways to view the invention, though each may imply a different embodiment of the invention.

For a given time-frequency slot, a given coordination pattern can be viewed as dividing the service area (and users) up in to multiple "cells". The DAS system in FIG. 8 illustrates this. Cells have boundaries over which antennas in one "cell" do not coordinate with those of other cells (except possibly loosely as described before). Over different coordination patterns, these cells (and their boundaries) change. In addition, as cells boundaries change, the antennas serving users change (implicitly).

A specific antenna, which can service different frequencies simultaneously, as in OFDM and most cellular systems, which are well known in the art, can at a given time be working as part of different clusters of antennas over different frequencies. For example, it may be on Cluster 1 on band F1, and Cluster 2 on band F2. The controllers, and associated base-stations, would ensure that only non-zero signals are generated for given antennas on given resources (such as time or frequency) as described in [0030-0035] above.

By varying the coordination patterns, i.e. using a set of coordination patterns, users are able to see different interference levels over different time and/or frequency resources. For example "user4" and "user5" sees less interference in FIG. 2, and "user6" and "user7" sees less interference in FIG. 4.

Coordination antennas also enable cooperative transmission over multiple antenna locations. Varying the pattern allows users like user4, user5, user6 and user7 to make better use of cooperative transmission. This is particularly useful for such users, i.e. users that are further away from stations, yet within transmission range of multiple stations.

By varying the assigned transmission antennas assigned to different areas, effectively changing the multi-cell structure, a user is now able to consider (relative to different antennas) a range of conditions (e.g., a range of SINRs), some that may be more favorable than others. This enables a multi-cell structure to provide different conditions to a given user over time and over frequency.

Note that embodiments of the invention based on coordinating three adjacent base-station or three remote antenna locations are described herein; however, the invention is not limited to such examples and can consider clusters of any cluster size, can consider patterns in which clusters have different sizes, and systems that have more than three sets of coordination patterns.

Cell and Antenna Coordination

As mentioned above, the ability to jointly coordinate such antennas depends on an inter-connectivity architecture. Such interconnectivity already exists in many systems between base-stations though some network interface (e.g., network interface 1002 of FIG. 9), or between antennas in a Distributed Antenna System (DAS) whereby a central entities drive the antennas. Entities within the system then perform the coordination of antennas (with in antenna subset) using this interconnectivity architecture. Such entities can in fact be "base-stations", or they can also be controllers such as those used in DAS systems and these can then direct transmission. For one embodiment, these entities, with an inter-connectivity architecture, vary the coordination pattern.

In one embodiment, the changes in coordination occur in a known, possibly pre-determined or adaptively controlled, fashion over time and/or over frequency. These changes could be implemented in a variety of ways. For example, in one embodiment, an external entity controls which pattern to use at which time. This may be a scheduling entity. One scheduler that applies well, and which is used in the embodiments is a Proportionally Fair Scheduler (PFS), which is well known in the art. Other embodiments of the invention can be implemented using independent schedulers for each pattern and coordinating cluster. In another embodiment, base-stations are used to control the varying of the coordination pattern. In one embodiment, a pre-programmed sequence of patterns that is stored within each base-station or antenna controller.

With respect to the physical layer in the wireless system, the changes are implemented either in time or frequency, as possible in an OFDM or OFDMA system. In one embodiment, a pattern exists for one or more frequencies at a given point in time, and those frequencies are used with a different pattern or patterns at another point in time. It could be that over time nothing changes, but that different patterns are used on different frequencies. Transmission resources may also be in code space, as in a Code Division Multiple Access (CDMA) system. Here different codes are applied to different patterns.

Elements of the invention can use a variety of physical layer designs, though Multi-user MIMO (MU-MIMO) techniques are particularly attractive given its ability to use multiple antennas to send signals concurrently to multiple users, and its ability control both signal and interference within a coordinated set of antennas.

Figure 5:
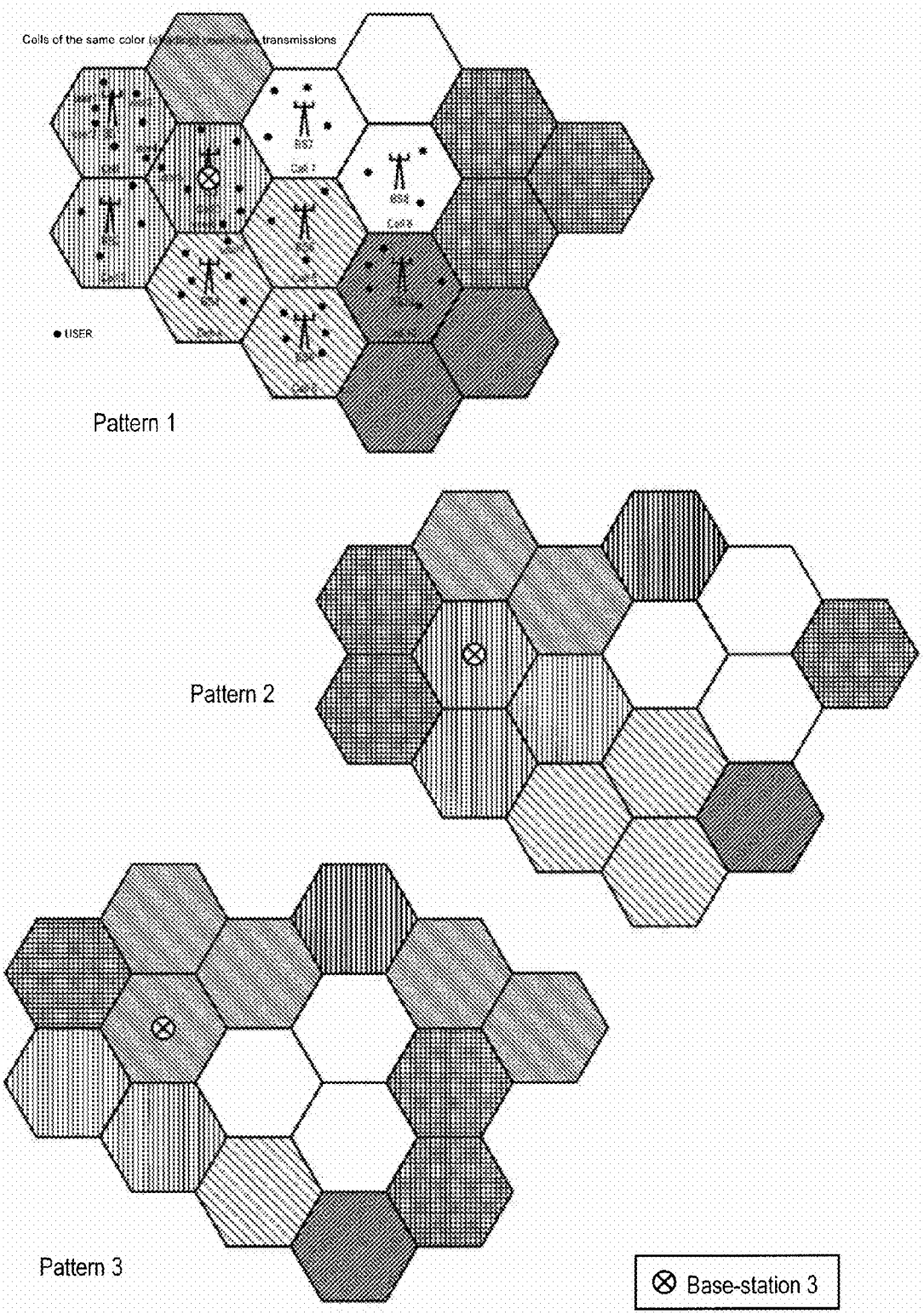
FIG. 5 illustrates three different coordination patterns over the same set of cells.

In one embodiment, base stations are used as coordination entities. FIG. 5 illustrates an embodiment of a communication system that uses coordination between base-stations. This can be viewed as a coordination pattern in which cooperation involves clusters of classic cells. As the pattern varies, the definitions of such "clusters" vary. In one embodiment, these are sufficient coordination patterns to allow users terminals to see a variety of signal conditions. For practical and implementation complexity reasons, one may limit the number of coordination patterns. If the cluster size is "C" (C=3 in FIG. 5), "C" base patterns are sufficient to give each cell one of "C" relative positions in a cluster of "C", e.g., for C=3, the cell can experience one of 3 positions relative to the cluster center.

Figure 6:
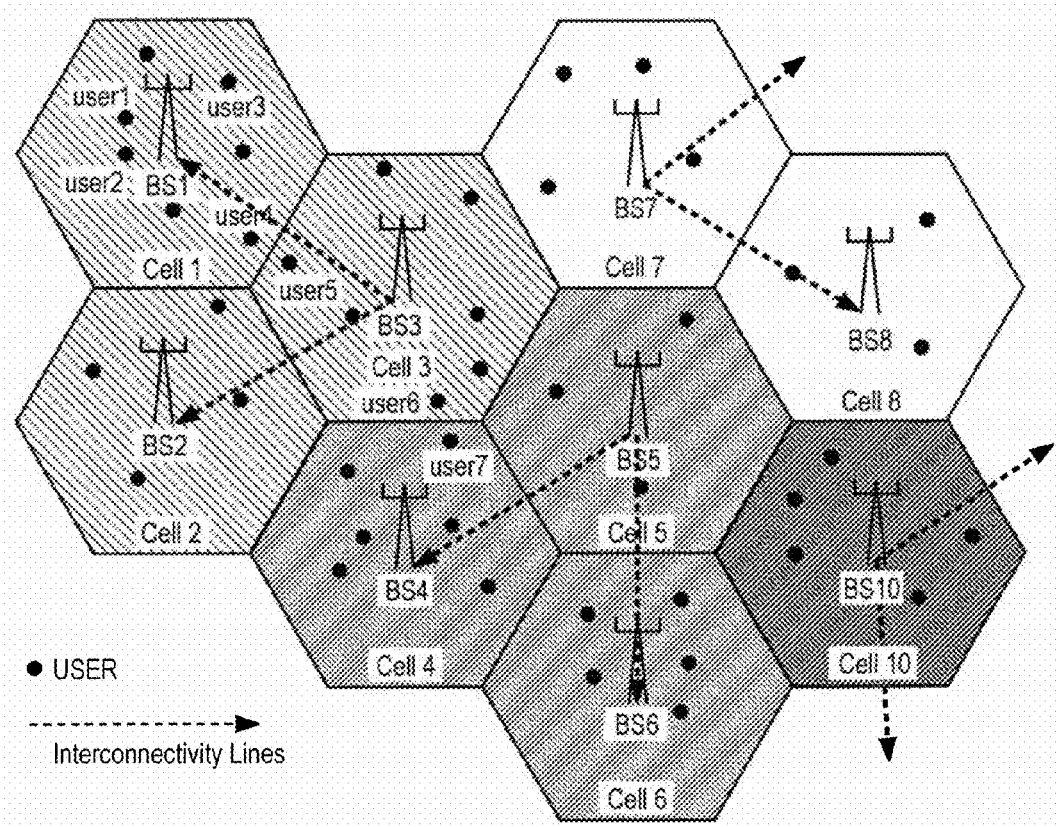
FIG. 6 illustrates the control and interconnectivity used in one embodiment when the system is the state of the pattern of FIG. 2 and where existing base-stations are used as the cluster controllers.

Referring to FIG. 6, the base-stations within each cluster are inter-connected to enable coordination. In one embodiment, each base-station has a "controller" within it that knows when and with which base-stations to coordinate transmissions. Such controllers can be pre-programmed to operate together without need for an external entity. The base-stations then initiates the various connections and information exchanges to other base-stations at the required times and for the required frequencies. As mentioned before, such information exchanges include outputs of either processing logic blocks 1001a, and/or baseband processing 1003. It may also include, or be limited to, which users to schedule in the cluster, the data intended for such users, linear coefficients to apply to transmissions for those users, etc.

In another embodiment, a subset of the stations acts as controller directing other base-stations. For example, Base-station 3 in FIG. 6 acts as a master directing the three clusters in which it participates. It would then, over various times, direct six neighboring stations (two for each pattern). This case, for the first coordination pattern, is illustrated in FIG. 6. Directing the six stations could include doing the required processing as in processing unit 1001a for such stations, doing the required baseband processing 1003 for such stations, or sending sufficient information directing local processing and baseband units to do required processing such that the six stations coordinate sufficiently and in a desired fashion.

Figure 7:
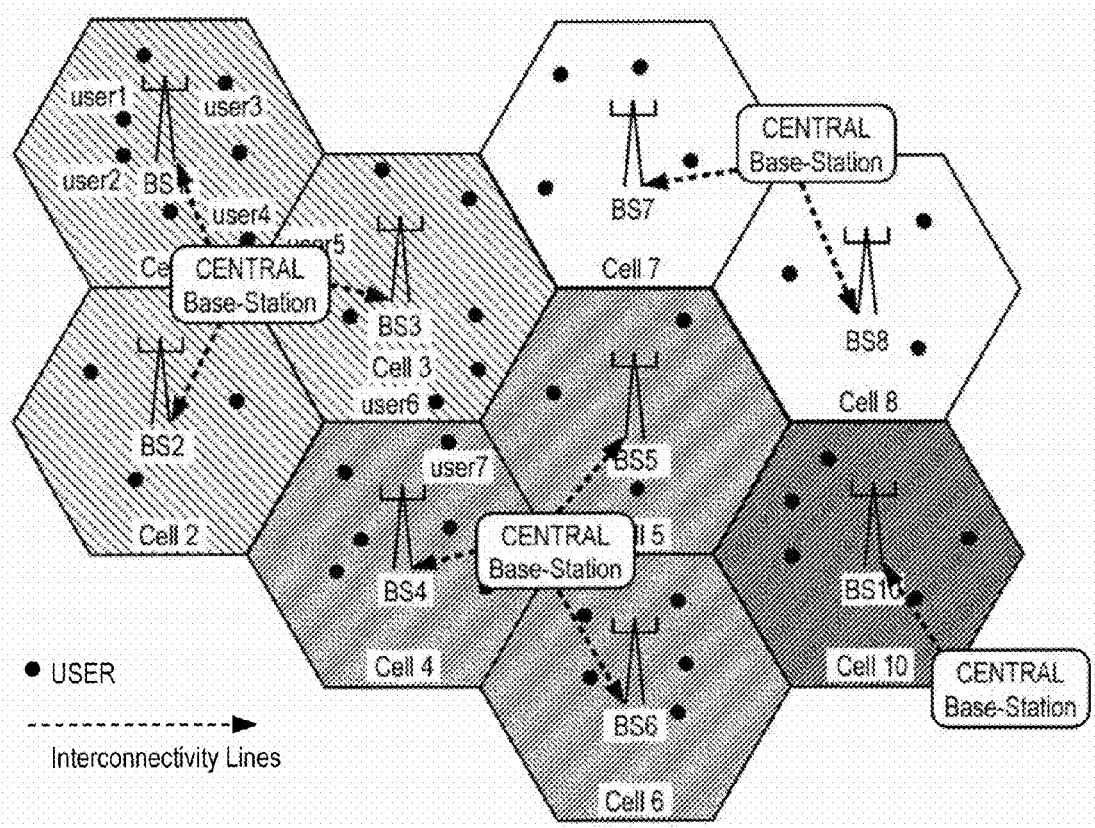
FIG. 7 illustrates the control and interconnectivity used in one embodiment when the system is the state of the pattern of FIG. 2 and where additional central base-stations are used as the cluster controllers.

In another embodiment, the system may use additional central base-stations to act as controllers directing other base-stations. The controllers can, as mentioned before, do various common processing functions, or simply direct local entities to so such processing functions in a coordinated fashion. An example of this case, for the first coordination pattern, is illustrated in FIG. 7. The same, or further additional controllers, can be used to direct antennas in other patterns. A base-station (whether central or existing) controlling a subset of coordinated antennas determines either by directly generating, or by directing local processing functions in remote stations to generate, the signal to place on such antennas. As with a standard base-station operation, it receives (or has) the information streams intended for scheduled users, produces the coded streams, performs the necessary signal processing required to map such streams to one or more signals that are then transmitted from antennas, and sends the transmission signal (or information sufficient to create the transmission signal) to the required antennas. The antennas then transmit the required signals. These standard operations are implemented for all antennas in each cluster, over all users being served by the cluster at a given time-frequency. The operation varies accordingly (changing with the antennas involved or the users to be served) as the coordination pattern varies. FIG. 9 is a block diagram of a base station, and is described in greater detail below.

The base-station, as in standard fixed-coordination architectures, also performs the necessary higher layer functions, such as ACKs, user scheduling, etc.

In another embodiment, DAS controllers are used to direct antennas. FIG. 8 represents an embodiment of a system using coordination between distributed antenna sites (distributed antennas). This operation can be viewed as a system in which each coordination pattern induces a particular cell-structure. Thus, the induced cell structure changes over many coordination patterns. It is advantageous to have sufficient coordination patterns to allow users to see a variety of signal conditions. For practical and implementation complexity reasons, one may limit the number of coordination patterns.

The antennas in a DAS are inter-connected to enable coordination. In one embodiment, a central controller sends signals (for example, over fiber) to remote antenna units (RAUs). As in a controller in a standard fixed-coordination pattern DAS, the central controller performs most of the signal processing necessary for transmission (e.g., modulation, channel coding, etc.), as done by blocks 1001 and 1003 in FIG. 9, then the central controller then sends either raw bits, transmission symbols, or even modulated signals to the RAUs (essentially units 1004 and antennas 1005) which put such signals onto radio signals. The central controller also takes care of signals/information at higher communication layers as done in units 1001 and 1002 in FIG. 9 (e.g., ACKs, user scheduling information, etc.).

Figure 10:
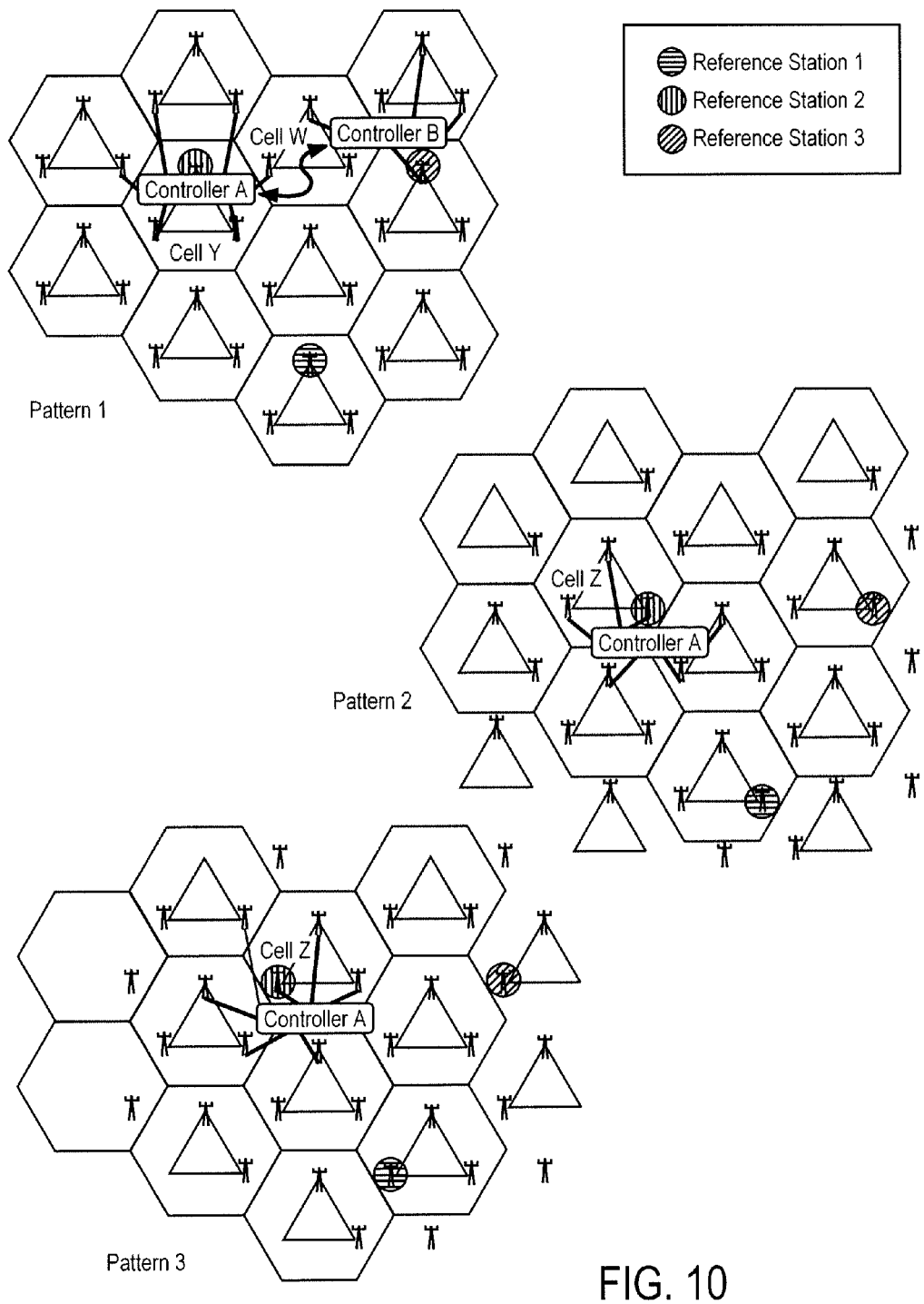
FIG. 10 is a block diagram of a DAS system having one of the many controllers.

In one embodiment, one controller controls all RAUs under consideration, simply using the RAUs in disjoint subsets for transmissions for different patterns. In another embodiment, there are several central controllers each connected to a subset of RAUs. One such controller, controller A, is illustrated in FIG. 10. This is connected to seven RAUs enabling the controller to control three possible cells, one in each pattern. These are cell X, cell Y and cell Z in FIG. 10.

One can also consider embodiments where central controllers work together for some "cells". For example controller A and controller B in this example may work together to control some shared cells, e.g. "Cell W" in FIG. 10.

In the mentioned embodiments, with base-stations or RAUs, patterns may also direct some of the antennas to switch on or off in various clusters or cells. For example, in any of the previously discussed figures, various antennas or base-stations may be powered off in various patterns. That is, they do not generate signals for antennas on various patterns. This is true especially for patterns implemented in time. For patterns implemented in frequency such switching on/off may occur individually for each frequency band.

Benefits of embodiments of the invention translate into users being able to see a variety of signal conditions, some more favorable than in a static (one pattern) system. This results in tangible metrics such as improving the rate the multi-cell system can support, in terms of sum throughput and/or individual user rates and/or fairness. It also has an effect of equalizing power over antennas since antennas are used in a variety of scenarios. This can have additional benefits in power control.

An Example of a Base Station

FIG. 9 is a block diagram of one embodiment of a base station that performs one or more of the functions described above. The base station may act as a cluster controller, or parts of a base-station may act as an antenna controller in conjunction with either other base-stations or RAUs as described above.

Referring to FIG. 9, the base station 1000 includes a control 1001 coupled to a network interface 1002 and baseband processing 1003. Baseband processing 1003 is also coupled to network interface 1002 and amplifiers/Tx/Rx 1004, which comprises the transmitter(s) and receiver(s) of the base station, along with their amplifiers, and these are coupled to antennas 1005. These operate in a manner well-known in the art. A power supply 1006 also provides power to components of base station 1000.

Control 1001 includes a control interface 1001(b) to send and receive control information, such as, for example, information specifying coordination patterns and/or information to control other base stations or antenna controllers, processor(s) 1001(a) to control, or cause to be controlled, many of the base station's operations (or operations of other base stations), including changes in coordination patterns. Memory 1001(c) stores instructions and other data, along with pre-defined coordination patterns, such as those described above. A timing/clock unit 1001(d) provides timing and/or clocking for the base station, in a manner well-known in the art.

In cluster systems, the baseband processing 1003 is jointly done, as part of one operation, for all antennas in a cluster. Such a unit may reside in one base-station, e.g. a controlling base-station as BS3 in FIG. 6, or it may reside in a central station as in FIG. 7, or it may reside in a controller for a DAS as in FIGS. 8 and 9. The function may also be divided among a number of baseband units residing in various remote base-stations or units. Here a common processing unit 1001*a* would create the signals to drive such baseband units. Therefore such a "single" baseband processing 1003 can also be implemented by separate processing entities, which may be connected to different subsets of antennas within a cluster. This can be achieved if the separate baseband processing units are controlled by a common set of instructions (as coming out of a common block for control 1001) such that each unit does effectively what is required (and would be done by a single entity) for its respective antennas. In this way, each unit can produce, effectively, the correct signals for the antennas it is connected to, such that the signals operate in the required joint fashion over all antennas in the cluster. Parts of control 1001 may also be divided over multiple units in various local stations, where some common set of instructions drive all such units to behave as a single unit.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A method for use in a wireless communication system having a plurality of cells with at least one transmission generating entity in each of the plurality of cells, and with two or more transmission resources, the method comprising:
   storing a set of predefined and different coordination patterns, where each of the coordination patterns directs which transmission generating entities are to coordinate together in their transmissions on each of the two or more transmission resources;
   varying which transmission generating entities coordinate with each other in their transmissions over each of the two or more transmission resources according to the predefined coordination patterns; and
   using at least one transmission generating entity for each of a plurality of clusters of cells to act as a cluster controller to direct other transmission generating entities within a corresponding cluster of cells as to what signals to generate for their antennas on each transmission resource with respect to a coordination pattern.

2. The method defined in claim 1 wherein the transmission generating entities comprise base stations or transmission antennas.

3. The method defined in claim 1 wherein the transmission resources are defined at slots in time, or subbands or tones in frequency, or polarization of wireless signals radiating from antennas, or spreading codes, or any combination thereof.

4. The method defined in claim 1 wherein varying which transmission generating entities that coordinate with each other is performed to cause users of the communication system to experience different interference levels over different transmission resources.

5. The method defined in claim 1 wherein varying transmission generating entities that coordinate with each other comprises varying which of the entities may simultaneously carry a set of signals destined for a common user or set of users on a common transmission resource.

6. The method defined in claim 1 wherein storing a set of predefined coordination patterns comprises storing the set of predefined coordination patterns in at least one of cluster controllers and base stations in the wireless communication system, where each of the patterns specifies which transmission resource is to be used with which transmission generating entity.

7. The method defined in claim 1 wherein the transmitted signals for a user or a set of users on a common transmission resource are determined by a common processing unit which creates inputs for amplifiers driving associated antennas used to support transmission, where the associated antennas to be used are specified by the coordination pattern.

8. The method defined in claim 1 wherein storing a set of predefined coordination patterns selected ahead of time comprise storing the set of predefined coordination patterns in controllers which are geographically remote from base stations acting as the transmission generating entities, where such controllers either replace or control various processing functions of the base stations.

9. The method defined in claim 1 further comprising operating one or more base stations in the system as cluster controllers to control when and with which base stations to coordinate transmissions.

10. An article of manufacture having one or more recordable storage media storing instruction thereon which when executed by a system cause the system to perform a method for use in a wireless communication system having a plurality of cells with a base station in each of the plurality of cells, the method comprising:
    storing a set of predefined and different coordination patterns, where each of the coordination patterns directs which transmission generating entities are to coordinate together in their transmissions on each of the two or more transmission resources;
    varying which transmission generating entities coordinate with each other in their transmissions over each of the two or more transmission resources according to the predefined coordination patterns; and
    using at least one transmission generating entity for each of a plurality of clusters of cells to act as a cluster controller to direct other transmission generating entities within a corresponding cluster of cells as to what signals to generate for their antennas on each transmission resource with respect to a coordination pattern.

11. The article of manufacture defined in claim 10 where the transmission generating entities comprise antennas or base stations.

12. The article of manufacture defined in claim 10 wherein varying which transmission generating entities coordinate to each other is performed to cause users of the communication system to experience different interference levels over different periods of time or frequency.

13. A base station for use in a cell of a wireless communication system having a plurality of cells, the base station comprising:
    a memory to store a set of predefined and different coordination patterns, where each coordination pattern specifies entities in the plurality of cells that are to coordinate together in their transmissions in each cluster of cells on different transmission resources;
    a controller, coupled to the memory, to vary entities that coordinate with each other in their transmissions in a cluster of cells containing the base station, over one transmission resource according to the predefined coordination patterns, wherein the controller is a cluster controller to direct other base stations within the cluster of cells containing the base station as to what signals to generate for their antennas on each transmission resource with respect to a coordination pattern.

14. The base station defined in claim 13 wherein each coordination patterns specifies which antennas within which cells are to coordinate together in their transmissions for each cluster.

15. The base station defined in claim 13 wherein the controller operates as a cluster controller to direct other base stations in the communication system with respect to coordinating transmissions.

16. The base station defined in claim 13 wherein the controller comprises a proportionally fair scheduler to control varying which base stations coordinate with each other.

17. A wireless communication system comprising:
a plurality of user terminals;
a plurality of a base stations;
a plurality of cells;
a memory to store a set of predefined and different coordination patterns, where each coordination pattern specifies entities in the plurality of base stations that are to coordinate together in their transmissions for each cluster of cells on different transmission resources; and
a controller to vary entities that coordinate with each other in their transmissions in each cluster of cells over a transmission resource according to the predefined coordination patterns, wherein at least one of the plurality of base stations for each cluster of cells operates as a cluster controller to direct other base stations within a corresponding cluster of cells as to what signals to generate for their antennas on each transmission resource with respect to a coordination pattern.

18. The system defined in claim 17 wherein each coordination patterns specifies which antennas within which cells are to coordinate together in their transmissions for said each cluster of cells.

19. The system defined in claim 17 wherein varying which antennas coordinate is performed to cause the plurality of user terminals to experience different interference levels over different periods of time or frequency.

20. The system defined in claim 17 wherein the controller is operable to vary which of the entities may simultaneously carry a set of signals destined for a common user or set of users on a common transmission resource.

21. The system defined in claim 17 wherein each of the plurality of base stations stores a set of predefined coordination patterns.

22. The system defined in claim 17 wherein one or more base stations, less than all of the plurality of base stations, act as cluster controllers knowing when and with which of the plurality of base stations to coordinate transmissions.

23. A method for use in a wireless communication system having a plurality of cells with a base station in each of the plurality of cells, the method comprising:
storing a set of predefined and different coordination patterns, where each coordination pattern specifies antennas in the plurality of cells that are to be coordinated together in their transmissions in each cluster of cells on different transmission resources defined in one or both of time and frequency;
varying antennas that coordinate with each other in their transmissions in each cluster of cells over one or both of time and frequency according to the predefined coordination patterns; and
using at least one base station for each cluster of cells to act as a cluster controller to direct other base stations within a corresponding cluster of cells as to what signals to generate for their antennas on each transmission resource with respect to a coordination pattern.

* * * * *